United States Patent
Fildebrandt et al.

(10) Patent No.: US 9,996,344 B2
(45) Date of Patent: Jun. 12, 2018

(54) CUSTOMIZED RUNTIME ENVIRONMENT

(71) Applicant: SAP SE, Walldorf (DE)

(72) Inventors: Ulf Fildebrandt, Oftersheim (DE);
Madhav Bhargava, Bangalore (IN);
Sachit Aggarwal, Bangalore (IN);
Tarun Ramakrishna Elankath,
Bangalore (IN); Sridhar Jayaraman,
Mannheim-Seckenheim (DE)

(73) Assignee: SAP SE, Waldorf (DE)

( * ) Notice: Subject to any disclaimer, the term of this patent is extended or adjusted under 35 U.S.C. 154(b) by 74 days.

(21) Appl. No.: 15/222,816

(22) Filed: Jul. 28, 2016

(65) Prior Publication Data
US 2018/0032329 A1    Feb. 1, 2018

(51) Int. Cl.
*G06F 9/44* (2018.01)

(52) U.S. Cl.
CPC . *G06F 8/76* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 8,850,304 B2* | 9/2014 | Ye | ............ | G06Q 30/08 715/224 |
| 2009/0320007 A1* | 12/2009 | Krishnaswamy | ... | G06F 9/44521 717/151 |
| 2010/0122258 A1* | 5/2010 | Reed | ........ | G06Q 10/06 718/102 |
| 2011/0187511 A1* | 8/2011 | Boldyrev | ............ | H04Q 5/22 340/10.51 |
| 2015/0348548 A1* | 12/2015 | Piernot | ............ | G10L 15/22 704/235 |
| 2017/0060558 A1* | 3/2017 | Koushik | ............ | G06F 8/61 |
| 2017/0223001 A1* | 8/2017 | Haddad | ............ | H04L 63/08 |

* cited by examiner

*Primary Examiner* — Chameli Das
(74) *Attorney, Agent, or Firm* — Schwegman Lundberg & Woessner, P.A.

(57) ABSTRACT

Methods, systems, and computer program products for creating a customized runtime environment are described. One or more runtime environment capabilities are determined based on a profile. One or more runtime bundles corresponding to the one or more runtime environment capabilities are identified and the identified runtime bundles are assembled.

16 Claims, 10 Drawing Sheets

FIG. 1A

```xml
<?xml version="1.0" encoding="UTF-8"?>
<project xmlns=http://maven.apache.org/POM/4.0.0xmlns:xsi="http://www.w3.org/2001/XMLSchema-instance"
  xsi:schemaLocation="http://maven.apache.org/POM/4.0.0http://maven.apache.org/maven-v4_0_0.xsd">
<modelVersion>4.0.0</modelVersion>
<parent>
    <groupId>com.sap.it.rt.components.b2b</groupId>
    <artifactId>http</artifactId>
    <version>1.13.0-SNAPSHOT</version>
</parent>
<artifactId>http.capabilities</artifactId>
<packaging>bundle</packaging>
<name>${project.groupId}.${project.artifactId}</name>
<build>
   <plugins>
     <plugin>
       <groupId>org.apache.felix</groupId>
       <artifactId>maven-bundle-plugin</artifactId>
       <configuration>
         <instructions>
           <Provide-Capability>com.sap.it.capability.adapter; name:String="HTTPS"; description:String=
           "Cloud HTTPS Component"; version:Version=1.0.1; metadata:String="/HttpSenderMetadata.xml"
           </Provide-Capability>
           <BundleSymbolicName>${project.groupId}.$ {project.artifactId}</Bundle-SymbolicName>
               </instructions>
         </configuration>
      </plugin>
   </plugins>
  </build>
</project>
```

CUSTOMIZED RUNTIME ENVIRONMENT

FIELD

The present disclosure relates generally to runtime environments. In an example embodiment, the disclosure relates to creating a customized runtime environment.

BACKGROUND

Software-based runtime environments are conventionally created in a one-size-fits-all manner. The runtime environments often offer the same functionality for all users. Thus, the generated runtime stacks for each user often contain processes that are not needed for performing tasks requested by the user. This may waste processing resources, storage resources, or both, and may increase the start-up time for the runtime environment.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for creating and managing a runtime environment are described. In an example embodiment, a customized runtime environment is created for a user.

A conventional runtime environment is typically initialized with a relatively small set of libraries, but the set of libraries and corresponding runtime stack often grows as more functionality is added. An offered software product may also contain a growing set of libraries as the product evolves over time. Different users, however, may have different processing requirements; each individual user does not typically need the full set of functionality, and therefore does not need the full runtime stack. Thus, use of the full runtime stack may waste processing resources and storage resources, and may lead to excessive startup times for the runtime environment. This may be especially pronounced in cloud environments where the costs for hardware and resource consumption should be minimized to provide a cost-effective environment.

In one example embodiment, the runtime environment is customized in accordance with a user's needs, use cases, and the like. Each feature (known as a capability herein) needed to satisfy the user's requirements and perform the user's use cases are identified and a runtime environment is created based on the set of identified capabilities. The customized runtime environment may save processing resources, storage resources, or both, may decrease the start-up time for the runtime environment, and may improve the overall runtime performance of the runtime environment. In order to create the customized bundles (software modules) that provide the capabilities for the customized runtime environment, technical boundary conditions need to be established to ensure that the selected bundles operate properly together.

In one example embodiment, a capability's metadata may be exposed (for example, from within a runtime bundle) to generate an overview of the capabilities of the customized runtime environment and to assist in identifying the components and applications needed to provide a functional runtime environment and the corresponding runtime stack. The metadata may be used during design time, monitoring, and the like, and may facilitate restriction of the user interfaces that a user sees (based on the user's use cases, requirements, capabilities, and the like). In one example embodiment, the node stack profile exposes the structure, capabilities, and semantic version of an application node.

Figure 1A:
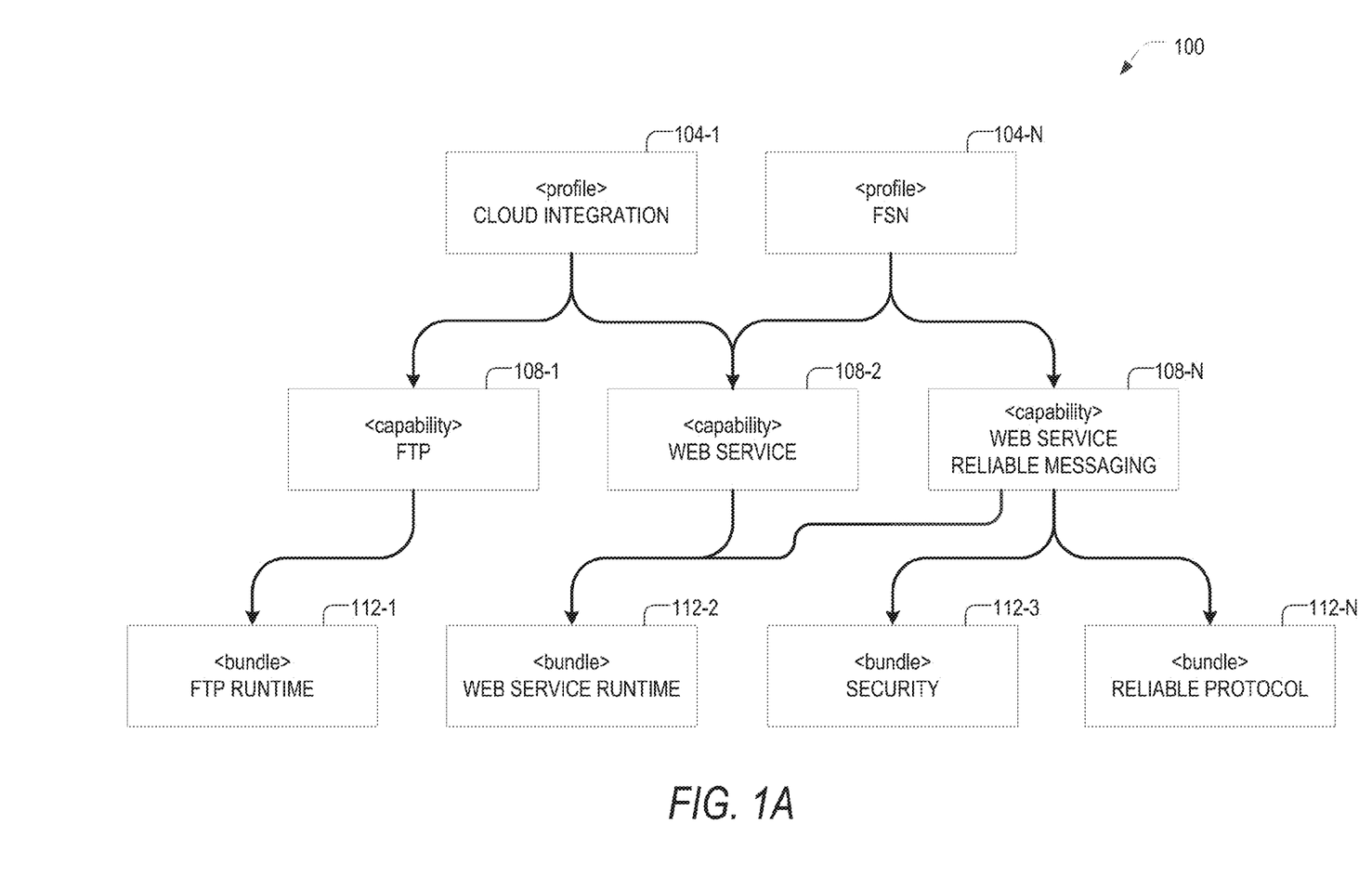
FIG. 1A illustrates an example of hierarchical information for specifying a customized runtime environment, in accordance with an example embodiment.

FIG. 1A illustrates an example of hierarchical information 100 for specifying a customized runtime environment, in accordance with an example embodiment. In one example embodiment, a profile, such as a cloud integration profile 104-1, a financial services network (FSN) profile 104-N, and the like (collectively known as profiles 104 herein), specify the capabilities utilized by the corresponding user service, use case, and the like. The profiles 104 may be defined in an XML file. Each profile 104 may identify, for example, a number of capabilities (e.g., capability files) where each capability specifies the runtime bundle(s) needed to implement the corresponding capability/capabilities. For example, the cloud integration profile 104-1 refers to an FTP capability definition 108-1 and a web service capability definition 108-2 (collectively known as capability definitions 108 herein). As illustrated in FIG. 1A, the financial services network profile 104-N refers to the web service capability definition 108-2 and the web service/reliable messaging capability definition 108-N. The web service/reliable messaging capability definition 108-N defines two capabilities: web service and reliable messaging.

The profiles 104 may be defined at a high-level, such as at the level of a service, a business task, a use case, and the like. A novice user may thereby be able to select a profile 104 that describes a runtime environment at a level understood by the novice user. A more experienced or more knowledgeable user may define a profile 104, define a capability definition 108 that specifies the capabilities to provide the service, task, and the like of the profile 104, or both. The most experienced or most knowledgeable users may define a profile 104, define the capability definition 108 that specifies the capabilities to provide the service, task, and the like of the profile 104, define the bundles that correspond to the capability definition 108, or any combination thereof.

Each capability definition 108 may be implemented as an XML file and may specify the bundles (known collectively as runtime bundles 112 herein) needed to implement the corresponding capability/capabilities. An FTP runtime bundle 112-1 contains the programs and resources for performing FTP operations, a web service runtime bundle 112-2 contains the programs and resources for providing web services, a security runtime bundle 112-3 contains the programs and resources for providing security services, and a reliable protocol runtime bundle 112-N contains the programs and resources for providing reliable communication services. The profiles 104 and capability definitions 108 may be used to identify the runtime bundles 112 needed to implement the selected user services, use cases, and the like.

Figure 1B:
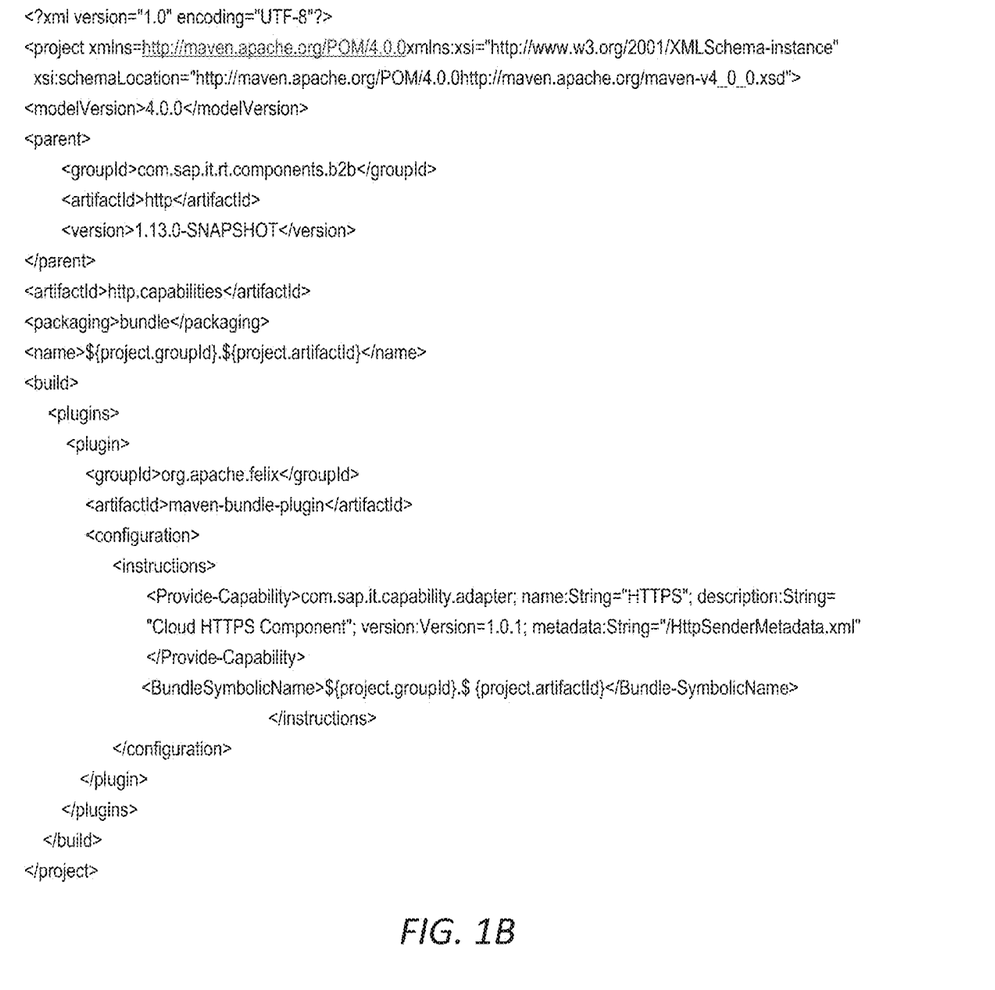
FIG. 1B illustrates an example of a manifest, in accordance with an example embodiment.

FIG. 1B illustrates an example of a manifest, in accordance with an example embodiment. Each capability is defined in the descriptor of the manifest. This may be implemented as a tag in the XML representation that references the component metadata file. The component metadata file contains a list of attributes, the type of the attributes, and user interface information like tooltips and labels for the attributes, and the grouping of attributes. An example of the profile 104 is given below.

Figure 2:
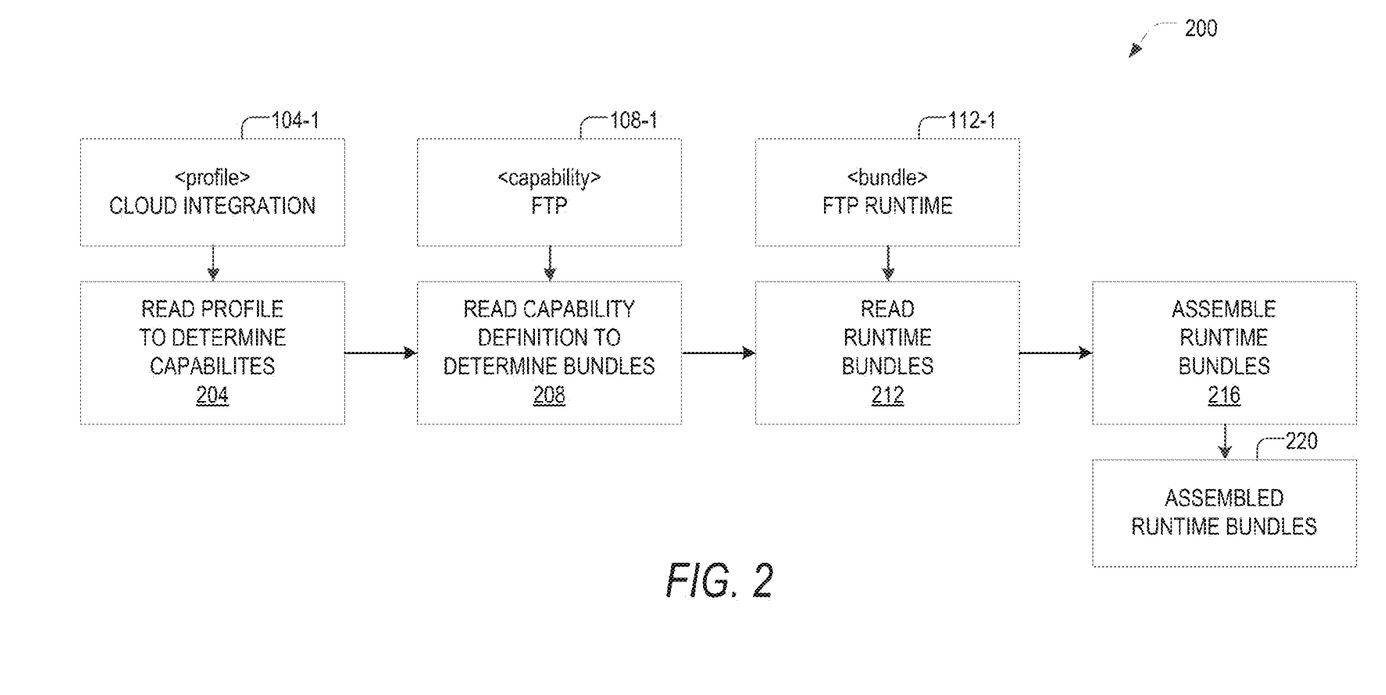
FIG. 2 illustrates an example workflow for creating a customized runtime environment, in accordance with an example embodiment.

FIG. 2 illustrates an example workflow 200 for creating a customized runtime environment, in accordance with an example embodiment. A profile 104, such as the cloud integration profile 104-1, is read to determine the capability/capabilities needed for the customized runtime environment, such as the capabilities defined by the capability definitions 108-1 and 108-2 (operation 204). The runtime bundle(s) 112, such as the FTP runtime bundle 112-1 and web service runtime bundle 112-2, needed to generate the customized runtime environment are determined by reading the capability definitions 108 referred to by the cloud integration profile 104-1 (operation 208). The determined runtime bundles 112 (the FTP runtime bundle 112-1 and web service runtime bundle 112-2) are read from a build repository (operation 212) and assembled to generate the assembled runtime bundles 220 of the customized runtime environment (operation 216).

In one example embodiment, the open standards of the Open Services Gateway initiative (OSGi) are used to customize the runtime bundles 112 and provide the corresponding capabilities defined by the selected profile 104. OSGi capabilities are attribute sets in a specific name space and requirements are filter expressions that assert the attributes of the capabilities of their corresponding name space. A requirement is satisfied when there is at least one capability that matches the filter. (The name space also provides the semantics of matching a requirement to a capability.)

The OSGi specification provides a dynamic component model based on the JAVA programming language and provides for the management of JAVA packages and classes. Components can be remotely installed/uninstalled, stopped/ started, updated remotely, and the like. The defined modular system facilitates the bundling of features and capabilities described above.

Structuring software as a bundle provides similar benefits for developing and managing software as using a JAVA class. The defined bundles consist of programs and resources that use metadata to declare imported and exported packages. A bundle allows its programs and resources to be utilized by other bundles by exporting a package. Similarly, a bundle can import a package to use the programs and resources of another bundle. Thus, bundles may be dependent on other bundles; the dependencies may be defined by the packages or, in terms of services, provided by the OSGi framework. A bundle containing a JAVA program that depends on a particular class must either contain the class or depend on a package that contains the class. Prior to loading and execution, the package dependencies of each bundle are resolved by the OSGi framework to ensure that the dependencies of the selected bundle(s) are met.

Bundles may be identified by a name and an identifier, and may be stored in a file using the JAR file format. Each bundle may contain a manifest and JAVA classes. The manifest is used to declare a bundle's symbolic name and version, as well as the package dependencies. In one example embodiment, the manifest defines the capability of the bundle, as described above. Each bundle has its own class loader to load its own classes. For classes belonging to other bundles (upon which the bundle depends), the class loader of the other bundle (that exports the package) is relied upon for loading the classes.

Figure 3A:
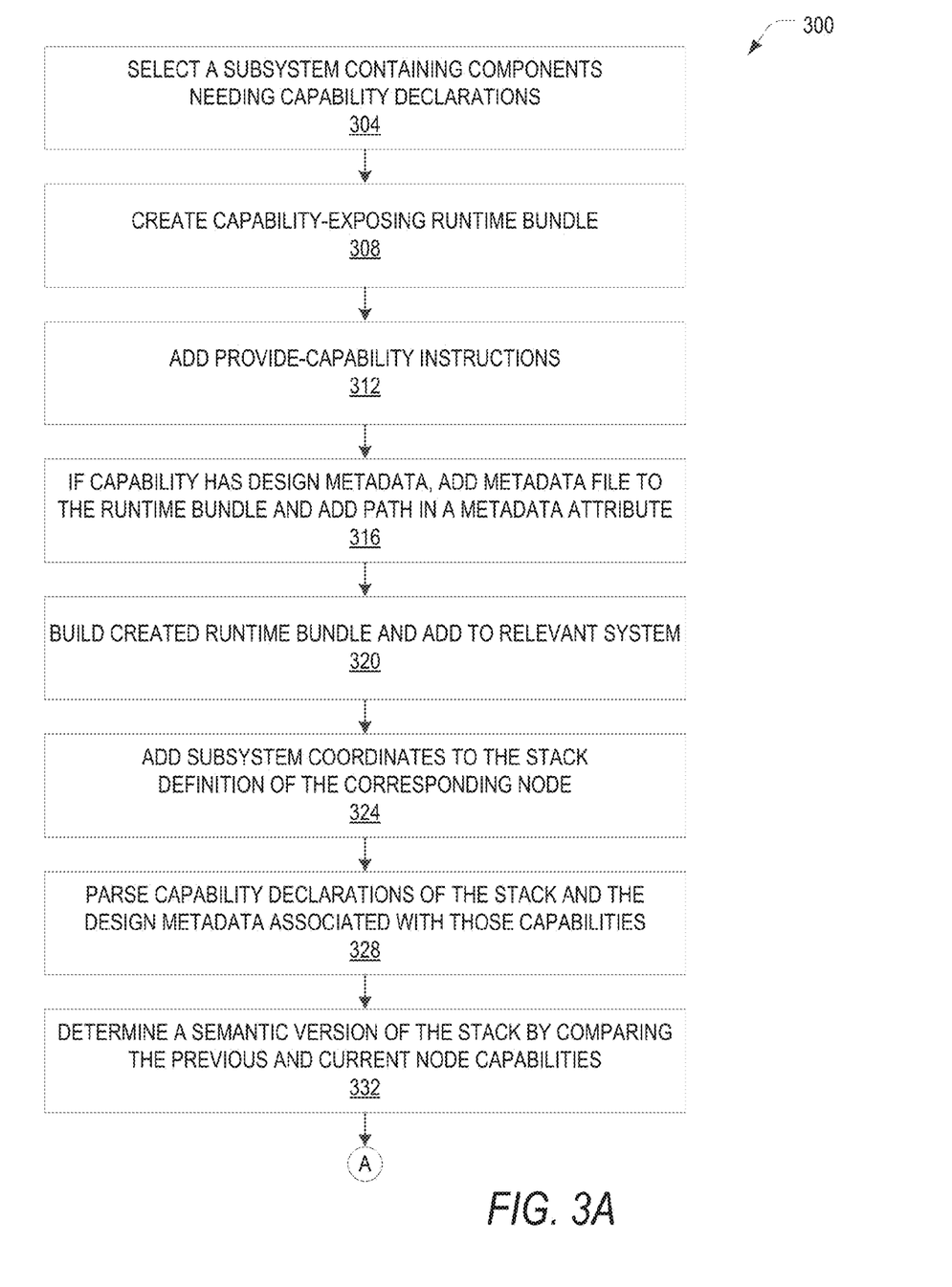
FIGS. 3A and 3B illustrate an example workflow for creating and deploying runtime bundles for a customized runtime environment, in accordance with an example embodiment.
Figure 3B:
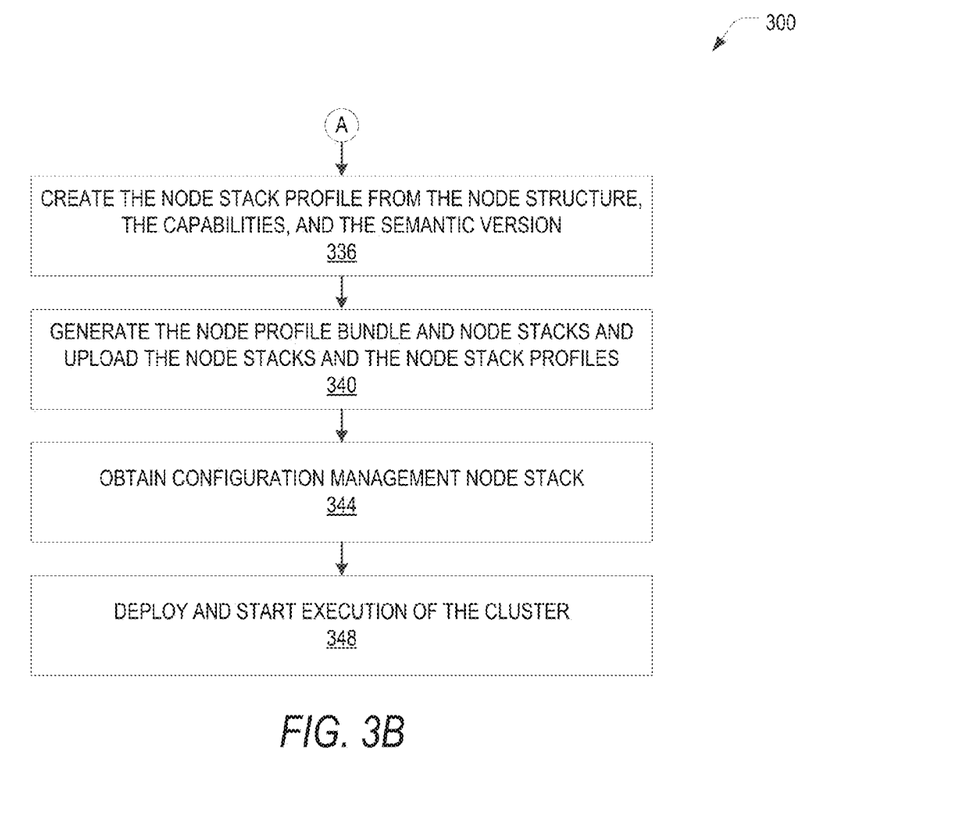

FIGS. 3A and 3B illustrate an example workflow 300 for creating and deploying runtime bundles 112 in a customized runtime environment, in accordance with an example embodiment. In one example embodiment, one or more of the operations of the workflow 300 are performed by the bundle creation module 620.

In one example embodiment, a subsystem containing components that need capability declarations is selected (operation 304). For example, an existing subsystem that contains functionality needed by a customized runtime environment may be identified and selected for updating that exposes the capabilities of each component. A capability-exposing runtime bundle 112 is created (identified by an appropriate name) (operation 308) and provide-capability instructions are added that specify the capabilities (operation 312). An example provide-capability instruction is:
   Provide-Capability: com.name.it.capability.adapter;
     name="IdocComponent";
     description:String="Component Name"; version:Version=1.0.0;
     metadata=/IdocComponentMetadata.xml The metadata attribute refers to a design time metadata entry in the runtime bundle 112 and may be accessed by a node manager. A provide-capability header is a manifest header that declares generic requirements and capabilities (in any name space). The provide-capability instructions may be included in the subsystem manifest, the bundle manifest, and the like.

If the capability has design metadata, such as the design metadata illustrated in FIG. 1B, a metadata file is added to the runtime bundle 112 and its path is added as a metadata attribute (operation 316). In one example embodiment, each capability has a name and version attribute where the version is parsed as an OSGi version. The namespace, name, and version comprise a capability key (which should be unique within the context of a node profile).

The created runtime bundle 112 is built and added to the relevant system (operation 320). The subsystem coordinates are added to the stack definition of the node (operation 324) and the capability declarations of the stack are parsed along with the design metadata associated with those capabilities (operation 328). The capability declarations may be parsed, for example, by a capability parser in a stack packager.

A semantic version of the stack is determined by comparing the previous and current node capabilities (operation 332) and the node stack profile is created from the node structure, the defined capabilities, and the semantic version (operation 336). The node profile bundle and node stacks are generated and the node stacks and the node stack profiles are uploaded for future use (operation 340). The configuration management node (CMN) node stack is obtained (operation 344), and the cluster is deployed and execution is started (operation 348).

Figure 4:
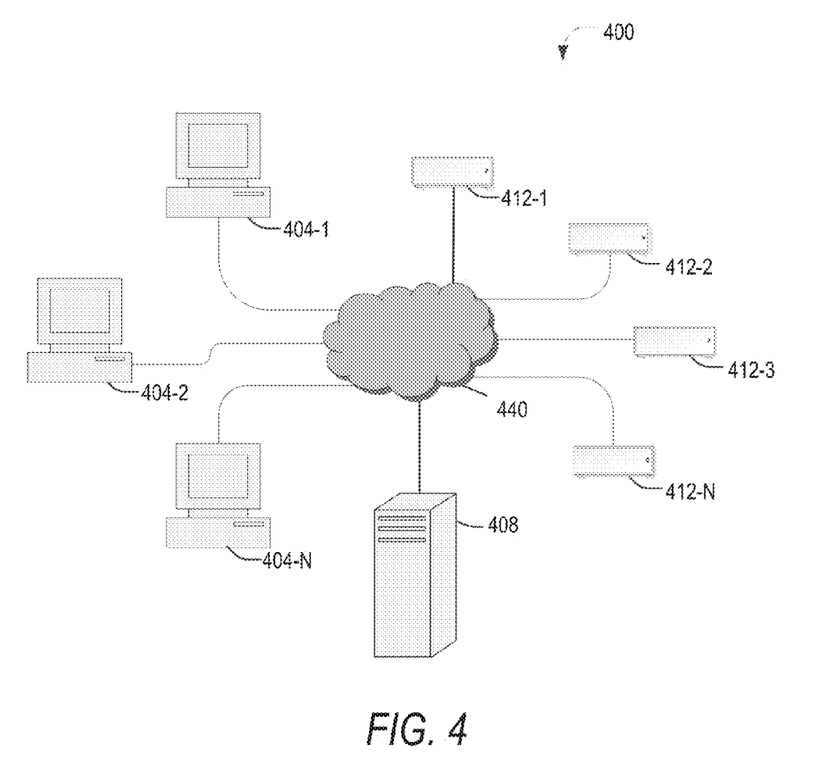
FIG. 4 is a block diagram of an example processing system for executing a customized runtime environment, in accordance with an example embodiment.

FIG. 4 is a block diagram of an example processing system 400 for executing a customized runtime environment, in accordance with an example embodiment. In one example embodiment, the system 400 comprises client devices 404-1, . . . 404-N (collectively known as client devices 404 hereinafter), a dispatcher 408, application nodes 412-1, . . . 412-N (collectively known as application nodes 412 hereinafter), and a network 440.

Each client device 404 may be a personal computer (PC), a tablet computer, a mobile phone, a telephone, a personal digital assistant (PDA), a wearable computing device (e.g., a smartwatch), or any other appropriate computer device. Client device 404 may include a user interface module. In one example embodiment, the user interface module may include a web browser program and/or an application, such as a mobile application, an electronic mail application, and the like. Although a detailed description is only illustrated for the client device 104, it is noted that other user devices may have corresponding elements with the same functionality.

The network 440 may be an ad hoc network, a switch, a router, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, another type of network, a network of interconnected networks, a combination of two or more such networks, and the like.

The dispatcher 408 receives a request from a client device 404 and forwards the request to an application node 412, and forwards responses from the application node 412 to the client device 404. The dispatcher 408 also maintains session information in a session table. The maintained information may include, for each node, the open session identifiers, a time of the last request, and the like.

The application nodes 412 process requests from client devices 404 and return responses for the processed requests. In the example embodiment of FIG. 4, the application nodes 412 receive requests from the client devices 404 via the dispatcher 408 and return the corresponding responses to the client devices 404 via the dispatcher 408.

Figure 5:
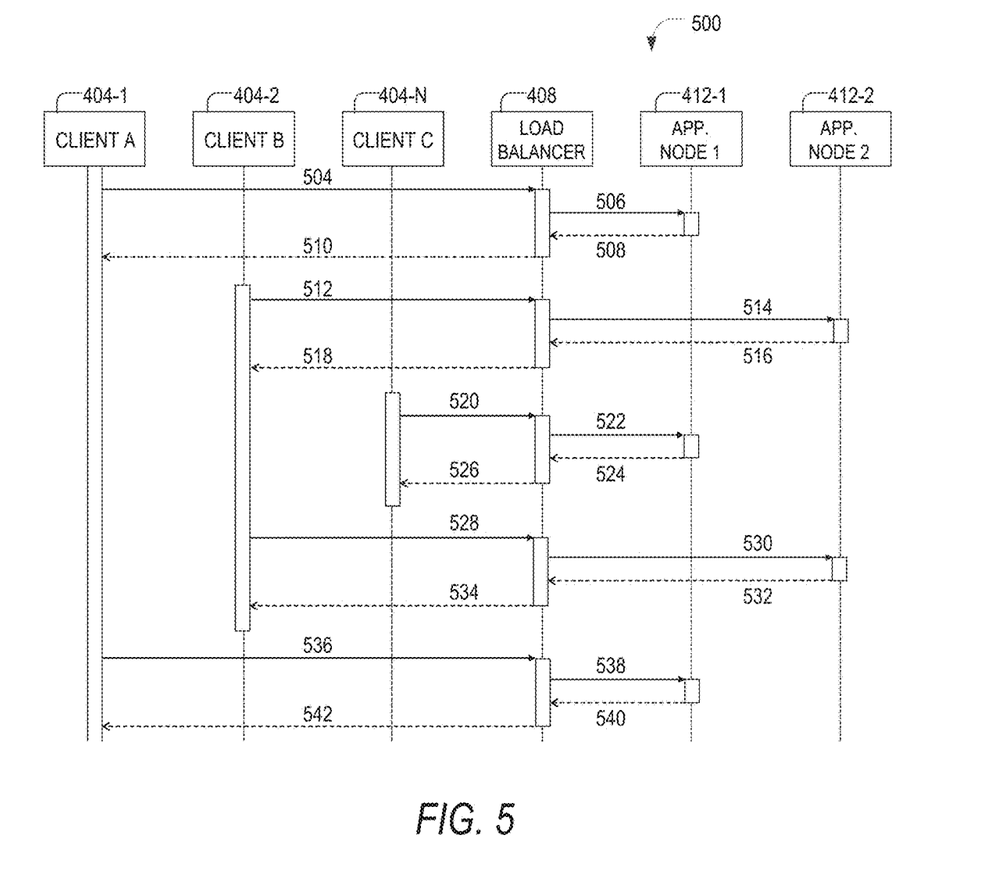
FIG. 5 is an example sequence diagram for dispatching requests in the customized runtime environment, according to an example embodiment.

FIG. 5 is an example sequence diagram 500 for dispatching requests in the customized runtime environment, according to an example embodiment. In one example embodiment, the application node 412-1 is executing the financial services network of the financial services network profile 104-N for the client device 404-1 (client A) and the client device 404-N (client C). The application node 412-2 is executing the cloud integration system of the cloud integration profile 104-1 for the client device 404-2 (client B). As illustrated in FIG. 5, the client device 404-1 (client A) issues a request 504 to the dispatcher 408 and the dispatcher 408 forwards a request 506 to the application node 412-1. Once the request 506 is processed, the application node 412-1 returns a response 508 to the dispatcher 408. The dispatcher 408 returns a response 510 to the client device 404-1.

Similarly, the client device 404-2 (client B) issues a request 512 to the dispatcher 408 and the dispatcher 408 forwards a request 514 to the application node 412-2. Once the request 514 is processed, the application node 412-2 returns a response 516 to the dispatcher 408 and the dispatcher 408 returns a response 518 to the client device 404-2. The client device 404-N (client C) issues a request 520 to the application node 412-1 via the dispatcher 408 (see, request 522, response 524, and response 526). In the example of request 528 from the client device 404-2, the request 528 includes a close command which is forwarded from the dispatcher 408 to the application node 412-2 via request 530. The application node 412-2 generates a response 532 and closes the corresponding session. The dispatcher 408 forwards response 534 to the client device 404-2.

Also, as illustrated in FIG. 5, client device 404-1 issues a second request 536 to the dispatcher 408 and the dispatcher 408 forwards a request 538 to the application node 412-1. Once the request 538 is processed, the application node 412-1 returns a response 540 to the dispatcher 408. In this case, the application node 412-1 returns the result to the dispatcher 408.

Figure 6:
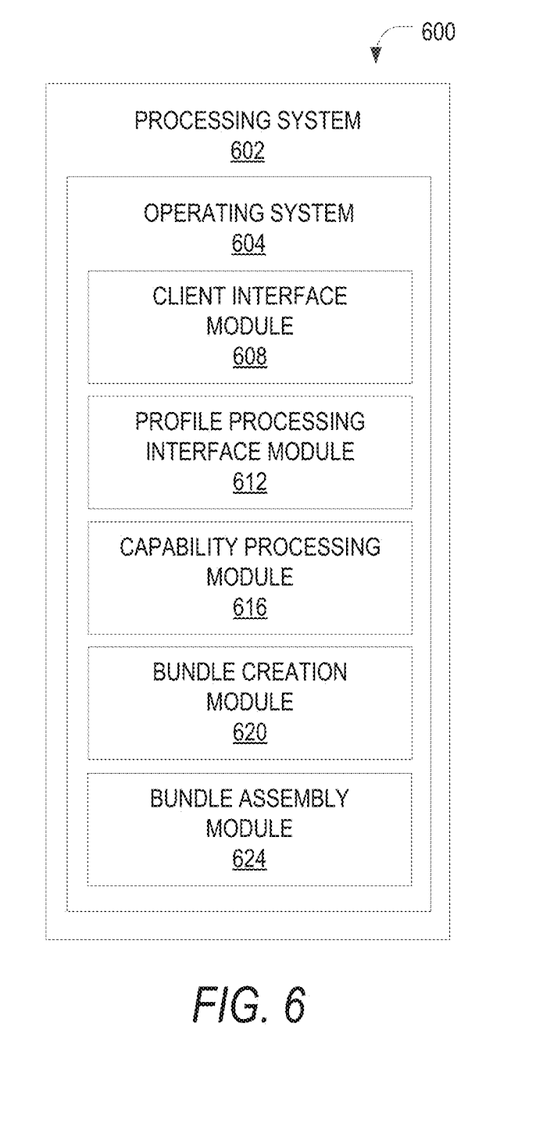
FIG. 6 is a block diagram of an example apparatus for creating the runtime bundles for a customized runtime environment, in accordance with an example embodiment.

FIG. 6 is a block diagram of an example apparatus 600 for creating the runtime bundles 112 for a customized runtime environment, in accordance with an example embodiment. The apparatus 600 is shown to include a processing system 602 that may be implemented on a client or other processing device, and that includes an operating system 604 for executing software instructions.

In accordance with an example embodiment, the apparatus 600 may include a client interface module 608, a profile processing module 612, a capability processing module 616, a bundle creation module 620, and an assembly module 624.

The client interface module 608 enables a user to define the profiles 104 and capability definitions 108, and to initiate the creation of a customized runtime environment based on a selected profile 104. The client interface module 608 supports XML editing to facilitate the creation of XML-compatible profiles 104 and capability definitions 108.

The profile processing module 612 reads and parses a selected profile 104 and determines the capability/capabilities needed for the customized runtime environment. For example, the profile processing module 612 may read and parse the profile 104. The capability processing module 616 reads the capability definitions 108, such as the FTP capability definition 108-1, identified by the profile processing module 612 and determines the runtime bundle(s) 112, such as the FTP runtime bundle 112-1, needed to generate the customized runtime environment.

The bundle creation module 620 creates the runtime bundles 112 for a customized runtime environment. In one example embodiment, a capability-exposing runtime bundle 112 is created. If the capability has design metadata, the bundle creation module 620 adds a metadata file to the runtime bundle 112 and adds its path as a metadata attribute. The bundle creation module 620 may also build the runtime bundle 112 and add it to the relevant system. The assembly module 624 reads the runtime bundles 112 from the build repository and assembles the runtime bundles 112 to create the assembled runtime bundles 220 for the customized runtime environment.

In one example embodiment, the assembly module 624 also adds the subsystem coordinates to the stack definition of the node and parses the capability declarations of the stack along with the design metadata associated with those capabilities. The assembly module 624 creates the node stack profile, generates the node profile bundle and node stacks, and uploads the node stacks and the node stack profiles. In one example embodiment, the CMN contains the profiles 104 and can start execution of the assembled runtime bundles 220 corresponding to a selected profile 104.

An example of a profile 104 for a Financial Services Network is the following:

```xml
<?xml version="1.0" encoding="UTF-8" standalone="yes"?>
<nodeStackProfile id="7d895e38-6c64-3d95-b8ae-d82737e6d464"
    name="ifl" displayName="SAP Financial Services Network" nodeType="IFL"
    nodeShipmentType="PRODUCTION" productVariant="HCI" version="2.17.0.SNAPSHOT"
    buildStamp="1468224120000"
mavenCoordinate="com.sap.it.node:stack.ifl:xml:stackprofile:2.17.0-SNAPSHOT">
    <subsystem symbolicName="com.sap.it.subsystem.base.webservice.core"
        version="1.38.1" startLevel="-1"

mavenCoordinate="com.sap.it.subsystem.base:webservice.core:esa:1.38.1">
        <bundle symbolicName="org.apache.servicemix.bundles.wsdl4j"
            version="1.6.3.1"
```

```xml
        </bundle>
    </subsystem>
    <tag name="node.version" value="2.17.0.SNAPSHOT" />
    <tag name="node.type" value="IFL" />
    <tag name="node.build.stamp" value="201607111002" />
    <systemProperties>
        <entry>
            <key xsi:type="xs:string" xmlns:xs="http://www.w3.org/2001/XMLSchema"
                xmlns:xsi="http://www.w3.org/2001/XMLSchema-instance">javax.ws.rs.ext.RuntimeDelegate</key>
            <value xsi:type="xs:string" xmlns:xs="http://www.w3.org/2001/XMLSchema"
                xmlns:xsi="http://www.w3.org/2001/XMLSchema-instance">org.apache.cxf.jaxrs.impl.RuntimeDelegateImpl</value>
        </entry>
        <entry>
            <key xsi:type="xs:string" xmlns:xs="http://www.w3.org/2001/XMLSchema"
                xmlns:xsi="http://www.w3.org/2001/XMLSchema-instance">java.security.properties</key>
            <value xsi:type="xs:string" xmlns:xs="http://www.w3.org/2001/XMLSchema"
                xmlns:xsi="http://www.w3.org/2001/XMLSchema-instance">/usr/lib/jvm/sapjvm_7/sapjvm_7/jre/lib/security/java.security.md5.enabled
            </value>
        </entry>
    </systemProperties>
</nodeStackProfile>
```

Figure 7:
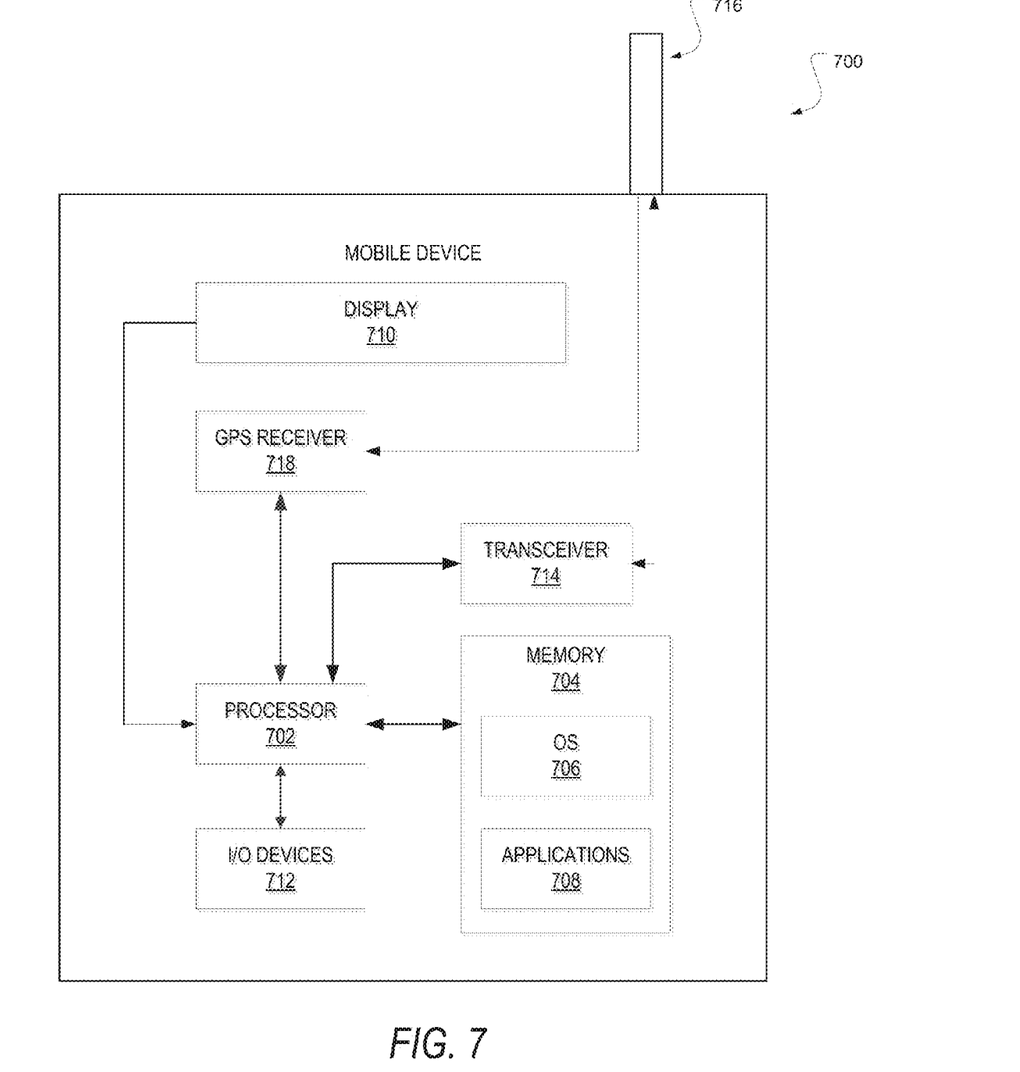
FIG. 7 is a block diagram illustrating a mobile device, according to an example embodiment.

FIG. 7 is a block diagram illustrating a mobile device 700, according to an example embodiment. The mobile device 700 can include a processor 702. The processor 702 can be any of a variety of different types of commercially available processors suitable for mobile devices 700 (for example, an XScale architecture microprocessor, a microprocessor without interlocked pipeline stages (MIPS) architecture processor, or another type of processor). A memory 704, such as a random access memory (RAM), a Flash memory, or other type of memory, is typically accessible to the processor 702. The memory 704 can be adapted to store an operating system (OS) 706, as well as applications 708, such as a mobile location enabled application that can provide location-based services (LBSs) to a user. The processor 702 can be coupled, either directly or via appropriate intermediary hardware, to a display 710 and to one or more input/output (I/O) devices 712, such as a keypad, a touch panel sensor, and a microphone. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a global positioning system (GPS) receiver 718 can also make use of the antenna 716 to receive GPS signals.

EXAMPLES

In one example embodiment, runtime bundles are configured for a computer system. A user profile is accessed prior to configuring a runtime environment, the user profile being stored in memory of the computer system. One or more runtime environment capabilities are determined based on the user profile and one or more runtime bundles corresponding to the one or more runtime environment capabilities are identified. The one or more runtime bundles are assembled.

In one example embodiment, the user profile defines a service, a use case, or a business task. In one example embodiment, at least one of the runtime bundles exposes metadata defining a capability of the corresponding runtime bundle. In one example embodiment, a subsystem containing at least one component that needs a capability declaration is selected and a metadata file is added to at least one of the runtime bundles, the at least one runtime bundle corresponding to the at least one component. In one example embodiment, subsystem coordinates are added to a stack definition of a stack for the runtime environment. In one example embodiment, capability declarations of the stack and associated design metadata are parsed.

In one example embodiment, a semantic version of the stack is determined by comparing previous and current capabilities of a corresponding application node. In one example embodiment, a node stack profile is created from a node structure, the runtime environment capabilities, and the semantic version of the stack. In one example embodiment, a node profile bundle and node stacks are generated. In one example embodiment, the assembled one or more runtime bundles are deployed. In one example embodiment, a user interface is presented for selecting one or more runtime environment capabilities for the user profile. In one example embodiment, the user profile is defined in an XML format. In one example embodiment, at least one of the runtime environment capabilities is defined in an XML format.

Figure 8:
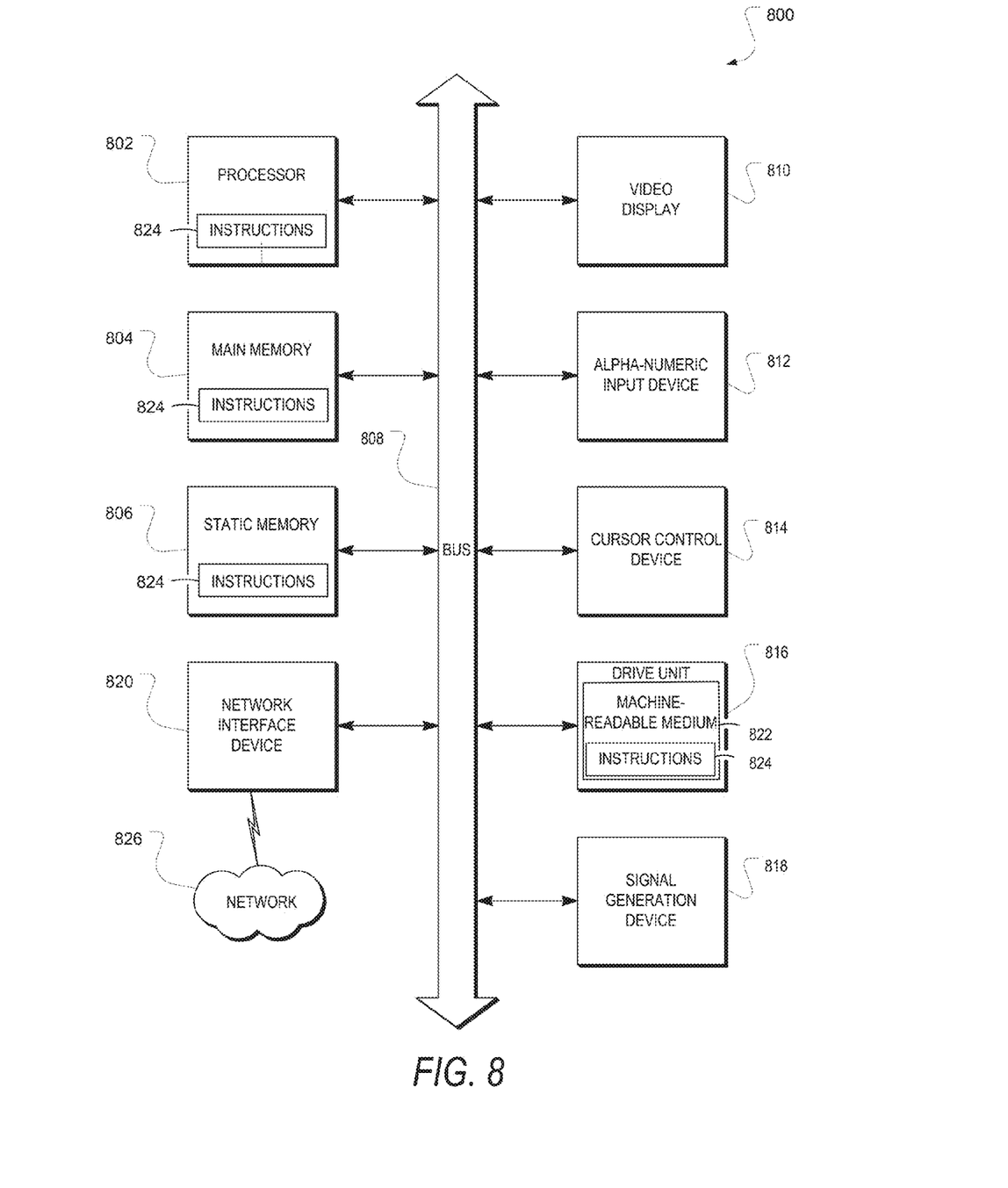
FIG. 8 is a block diagram of a computer processing system within which a set of instructions may be executed for causing a computer to perform any one or more of the methodologies discussed herein.

FIG. 8 is a block diagram of a computer processing system 800 within which a set of instructions 824 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a personal digital assistant (PDA), a cellular telephone, or any processing device capable of executing a set of instructions 824 (sequential or otherwise) that specify actions to be taken by that device. Further, while only a single computer is illustrated, the term "computer" shall also be taken to include any collection of computers that, individually or jointly, execute a set (or multiple sets) of instructions 824 to perform any one or more of the methodologies discussed herein.

The example computer processing system 800 includes a processor 802 (e.g., a central processing unit (CPU), a graphics processing unit (GPU), or both), a main memory 804, and a static memory 806, which communicate with each other via a bus 808. The computer processing system 800 may further include a video display 810 (e.g., a plasma display, a liquid crystal display (LCD), or a cathode ray tube (CRT)). The computer processing system 800 also includes an alphanumeric input device 812 (e.g., a keyboard), a user interface (UI) navigation device 814 (e.g., a mouse and/or touch screen), a drive unit 816, a signal generation device 818 (e.g., a speaker), and a network interface device 820.

The drive unit 816 includes a machine-readable medium 822 on which is stored one or more sets of instructions 824 and data structures embodying or utilized by any one or more of the methodologies or functions described herein. The instructions 824 may also reside, completely or at least partially, within the main memory 804, the static memory 806, and/or within the processor 802 during execution thereof by the computer processing system 800, the main memory 804, the static memory 806, and the processor 802 also constituting tangible machine-readable media 822.

The instructions 824 may further be transmitted or received over a network 826 via the network interface device 820 utilizing any one of a number of well-known transfer protocols (e.g., Hypertext Transfer Protocol).

While the machine-readable medium 822 is shown, in an example embodiment, to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding, or carrying a set of instructions 824 for execution by the computer and that cause the computer to perform any one or more of the methodologies of the present application, or that is capable of storing, encoding, or carrying data structures utilized by or associated with such a set of instructions 824. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method of configuring runtime bundles on a computer system, the method comprising:
    selecting a subsystem containing at least one component that needs a capability declaration;
    accessing a user profile prior to configuring a runtime environment, the user profile being stored in memory of the computer system;
    determining, by one or more hardware processors of the computer system, one or more runtime environment capabilities based on the user profile;
    identifying, by the one or more hardware processors, one or more runtime bundles corresponding to the one or more runtime environment capabilities;
    adding a metadata file to at least one of the runtime bundles, the at least one runtime bundle corresponding to the at least one component;
    assembling the one or more runtime bundles; and
    adding subsystem coordinates to a stack definition of a stack for the runtime environment.

2. The computerized method of claim 1, wherein the user profile defines a service, a use case, or a business task.

3. The computerized method of claim 1, wherein at least one of the runtime bundles exposes metadata defining a capability of the corresponding runtime bundle.

4. The computerized method of claim 1, further comprising parsing capability declarations of the stack and associated design metadata.

5. The computerized method of claim 4, further comprising determining a semantic version of the stack by comparing previous and current capabilities of a corresponding application node.

6. The computerized method of claim 5, further comprising creating a node stack profile from a node structure, the runtime environment capabilities, and the semantic version of the stack.

7. The computerized method of claim 6, further comprising generating a node profile bundle and node stacks.

8. The computerized method of claim 6, further comprising deploying the assembled one or more runtime bundles.

9. The computerized method of claim 1, further comprising presenting a user interface for selecting one or more runtime environment capabilities for the user profile.

10. The computerized method of claim 1, wherein at least one of the runtime environment capabilities and the user profile is defined in an XML format.

11. An apparatus for configuring runtime bundles on a computer, the apparatus comprising:
    one or more processors;
    memory to store instructions that, when executed by the one or more hardware processors perform operations comprising:
    selecting a subsystem containing at least one component that needs a capability declaration;
    accessing a user profile prior to configuring a runtime environment, the user profile being stored in memory of the computer system;
    determining, by one or more hardware processors of the computer system, one or more runtime environment capabilities based on the user profile;
    identifying, by the one or more hardware processors, one or more runtime bundles corresponding to the one or more runtime environment capabilities;
    adding a metadata file to at least one of the runtime bundles, the at least one runtime bundle corresponding to the at least one component;
    assembling the one or more runtime bundles; and
    adding subsystem coordinates to a stack definition of a stack for the runtime environment.

12. The apparatus of claim 11, wherein at least one of the runtime bundles exposes metadata defining a capability of the corresponding runtime bundle.

13. The apparatus of claim 11, the operations further comprising parsing capability declarations of the stack and associated design metadata.

14. The apparatus of claim 13, the operations further comprising determining a semantic version of the stack by comparing previous and current capabilities of a corresponding application node.

15. The apparatus of claim 14, the operations further comprising creating a node stack profile from a node structure, the runtime environment capabilities, and the semantic version of the stack.

16. A non-transitory machine-readable storage medium comprising instructions, which when implemented by one or more machines, cause the one or more machines to perform operations comprising:
    selecting a subsystem containing at least one component that needs a capability declaration;
    accessing a user profile prior to configuring a runtime environment, the user profile being stored in memory of the computer system;
    determining, by one or more hardware processors of the computer system, one or more runtime environment capabilities based on the user profile;
    identifying, by the one or more hardware processors, one or more runtime bundles corresponding to the one or more runtime environment capabilities;
    adding a metadata file to at least one of the runtime bundles, the at least one runtime bundle corresponding to the at least one component;
    assembling the one or more runtime bundles; and
    adding subsystem coordinates to a stack definition of a stack for the runtime environment.

* * * * *